United States Patent Office 3,415,762
Patented Dec. 10, 1968

3,415,762
TITANIUM CHELATE COMPOUND AND TITANIUM PHOSPHINATE POLYMER PREPARED THEREFROM
Burton Peter Block, Chester County, Pa., and Gerd Helmut Dahl, Upper Merion Township, Montgomery County, Pa., assignors to Pennsalt Chemicals Corporation, Philadelphia, Pa., a corporation of Pennsylvania
No Drawing. Filed June 2, 1966, Ser. No. 554,698
12 Claims. (Cl. 260—2)

This invention relates to new titanium chelate compounds and to new titanium phosphinate polymers derived from said chelate compounds. More particularly this invention is concerned with a titanium chelate compound of the formula

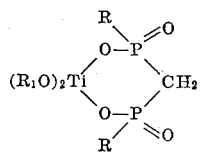

where $R_1$ represents an alkyl radical having one to four carbon atoms and R represents an alkyl radical or halogeno-substituted alkyl radical having one to ten carbon atoms, or a phenyl radical or mono- or multi-substituted phenyl radical wherein the substituents on said phenyl group are independently selected from the group consisting of the halogens and alkyl groups having one to eight carbon atoms, the halogen substituents on the halogeno-substituted radicals being selected from the group consisting of fluorine, chlorine and bromine. The R radicals may be the same or different. Representative substituted R radicals are, for example, orthochlorophenyl, orthomethylphenyl, pentafluorophenyl, 2,4 - dichlorophenyl, 2,4 - dimethylphenyl, ethylphenyl, chloromethylphenyl, ortho-bromophenyl, chloromethyl, heptafluoroisopropyl, fluorocyclohexyl and the like. This invention is also particularly concerned with a titanium phosphinate polymer to which is assigned the following repeating structural unit:

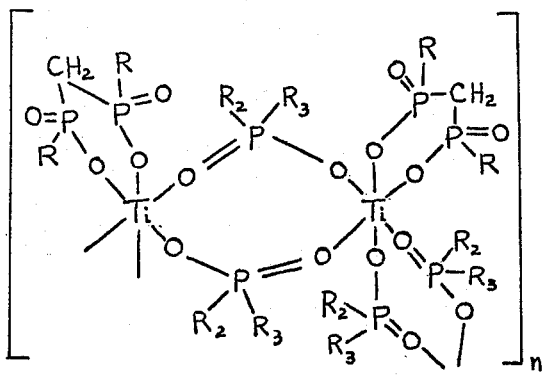

where $R_2$ and $R_3$ are selected from the group consisting of alkyl radicals and halogeno-substituted alkyl radicals having one to ten carbon atoms, phenyl radicals and mono- or multi-substituted phenyl radicals wherein the substituents on said substituted phenyl radicals are independently selected from the group consisting of the halogens and alkyl groups having one to eight carbon atoms, the halogen substituents on said above halogeno-substituted radicals being selected from the group consisting of fluorine, chlorine and bromine.

Our copending application for patent, Ser. No. 534,650, filed Mar. 16, 1966, discloses the preparation of P,P'-disubstituted-methylene-diphosphinic acids of the formula $[RP(O)OH]_2CH_2$ which can be pictorially represented by the following structure, the R radicals being as previously defined.

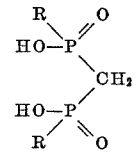

The titanium chelates of this invention are obtained by reacting a titanium alkoxide, i.e., $Ti(OR_1)_4$ where $R_1$ is an alkyl group having one to four carbon atoms, with the above-described P,P' - disubstituted-methylenediphosphinic acid, viz.,

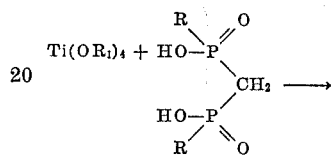

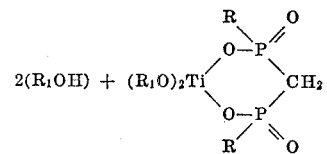

The above reaction to produce the titanium chelate compounds of this invention is carried out at temperatures ranging from about 20° C. to about 135° C., preferably between about 25° C. and 112° C. The disubstituted-methylene-diphosphinic acid is added to a solution of the titanium alkoxide in a solvent such as benzene, toluene, chloroform or xylene. The stoichiometric proportions of the reactants are essentially equimolar. Depending upon the particular solvent chosen and the amount present, the product will precipitate and is recovered by filtration, or it can be recovered by the removal of the solvent by distillation.

The titanium chelate compounds embodied herein are useful as cross-linking agents for cellulose polymers. Another use is as a prime coat for metal substrates to enhance the adhesion thereto of conventional topcoats, e.g., alkyds, polyalkylacrylates and other polymeric surface coating materials. However, their prime utility is as starting materials for the preparation of titanium phosphinate polymers having the repeating structural unit depicted earlier. The polymers are prepared by reacting the titanium chelate with a phosphinic acid having the formula $R_2R_3P(O)OH$, the radicals $R_2$ and $R_3$ having been defined above. The reaction is desirably carried out in a solvent such as benzene, toluene, xylene, tetrachloroethane or chloroform using a 1:2 molar ratio of the titanium chelate to the phosphinic acid. The reaction mixture is heated in the range of about 60° C. to 150° C. for a period of about one to eight hours. The product polymer is isolated by removal of the solvent by distillation.

The titanium phosphinate polymers embodied herein are characterized by enhanced thermal stability due to the absence of carbon to carbon bonds in the main polymer backbone. The molecular weights of the polymers will generally be in the range of about 2,000 to greater than 10,000 e.g., up to about 100,000, as determined by the well known thermoelectric vapor pressure measurement method. The polymers, which have softening points in the range of about 170° C. to over 300° C., are useful as corrosion resistant coatings for metal surfaces exposed to salt water spray. The coatings are conveniently applied by spraying the metal substrate with a solution of the polymer in a solvent such as benzene or toluene. The solvent is evaporated at ambient or elevated temperatures to leave a film of the polymer on the metal surface.

The illustrative examples that follow serve to clarify the invention and should not be construed as limitative of the scope thereof.

Example 1.—Preparation of titanium chelate

P,P'-diphenylmethylenediphosphinic acid,

(5.79 parts, 0.0196 mole), prepared according to Example 1 of our copending application Ser. No. 534,650, filed Mar. 16, 1966, is added with stirring to a solution of titanium isopropoxide (5.56 parts, 0.0196 mole) in 175 ml. of benzene maintained under a nitrogen atmosphere. The benzene and liberated isopropanol are removed from the reaction mixture by distillation and the product residue is dried in vacuo. The product is identified as the titanium chelate compound

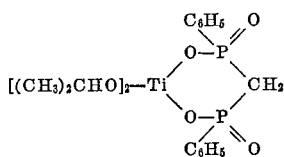

*Analysis.*—Found: C, 48.96; H, 8.95; Ti, 10.7. Calculated for $C_{19}H_{26}O_6P_2Ti$: C, 49.58; H, 5.70; Ti, 10.4. The titanium chelate, recovered in a 96% yield, is an infusible white solid having a melting point above 440° C. The chelate is soluble in common organic solvents such as benzene, toluene and chloroform.

Example 2.—Preparation of titanium phosphinate polymer

Approximately 1.8 parts of the above-described titanium chelate compound is dissolved in benzene, and 1.22 parts of methylphenylphosphinic acid,

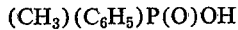

is mixed therewith to give a clear solution. The reaction is carried out at reflux (about 80° C.) for two hours. The benzene and by-product isopropanol are removed by distillation to leave a polymeric product in 98% yield having the appearance of a white solid. It is dried in vacuo at 90° C. The polymer, which has a softening point of 170° C., is soluble in organic solvents such as ethanol, $CHCl_3$, acetone, and tetrahydrofuran. The following repeating structural unit is assigned to this polymeric substance.

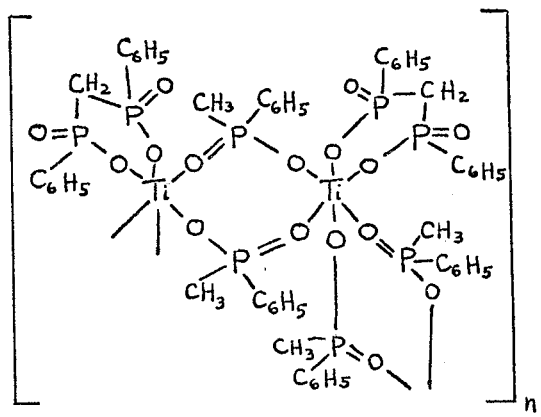

*Analysis.*—Found: C, 49.78; H, 5.28; P, 19.25; Ti, 7.26. Calculated for $C_{27}H_{28}O_8P_4Ti$: C, 49.71; H, 4.33; P, 19.04; Ti, 7.34.

Example 3

Using the method described in Example 1, $Ti(OC_2H_5)_4$ is reacted with $[CH_3P(O)OH]_2CH_2$ in refluxing benzene. The product $(C_2H_5O)_2Ti[CH_3P(O)O]_2CH_2$, is recovered by removal of the solvent by distillation. This titanium chelate compound is reacted in refluxing toluene with methyl(4-chlorophenyl)phosphinic acid for five hours. The solvent is removed by distillation and the colorless polymeric product of the repeating unit

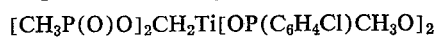

is dried in vacuo at 100° C.

Example 4

In accordance with the procedure of Example 1,

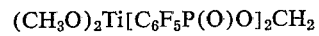

is prepared from the reaction of $Ti(OCH_3)_4$ with

in refluxing toluene. The titanium chelate is isolated and reacted with dioctylphosphinic acid in tetrachloroethane at 125° C. for about three hours to yield a polymer of the repeating unit $[C_6F_5P(O)O]_2CH_2Ti[OP(C_8H_{17})_2O]_2$.

Example 5

The reaction of $Ti[OCH(CH_3)_2]_4$ with

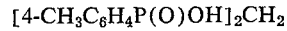

in refluxing toluene according to the method of Example 1 yields the chelate,

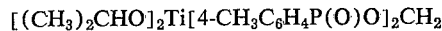

which precipitates from solution and is recovered by filtration and then dried. The chelate is reacted with diphenylphosphinic acid in xylene at 130° C. for about 7 hours. The product, recovered by removal of the solvent by distillation, is the polymer having the repeating unit

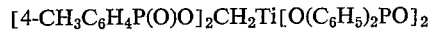

We claim:
1. A titanium chelate compound of the formula

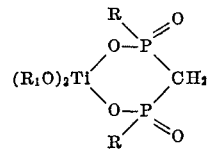

where $R_1$ is an alkyl radical having one to four carbon atoms and R represents a radical selected from the class consisting of
   (a) alkyl having one to ten carbon atoms;
   (b) halogeno-substituted alkyl having one to ten carbon atoms wherein the halogen substituents are selected from the group consisting of fluorine, chlorine and bromine;
   (c) phenyl;
   (d) substituted phenyl wherein the substituents are independently selected from the group consisting of fluorine, chlorine, bromine and alkyl groups having one to eight carbon atoms.
2. A compound according to claim 1 where the R radicals are each phenyl.
3. A compound according to claim 1 where the R radicals are each methyl.
4. A compound according to claim 1 where the R radicals are each pentafluorophenyl.
5. A compound according to claim 1 where the R radicals are each methyl phenyl.
6. A compound according to claim 1 where the R radicals are each chlorinated phenyl.

7. A titanium phosphinate polymer composed of the repeating unit

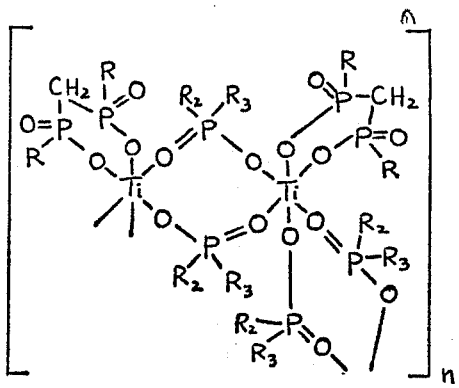

where $R$, $R_2$, and $R_3$ are radicals selected from the class consisting of
  (a) alkyl having one to ten carbon atoms;
  (b) halogeno-substituted alkyl having one to ten carbon atoms wherein the halogen substituents are selected from the group consisting of fluorine, chlorine, and bromine;
  (c) phenyl;
  (d) substituted phenyl wherein the substituents are independently selected from the group consisting of fluorine, chlorine, bromine and alkyl groups having one to eight carbon atoms.

8. A polymer according to claim 7 where the R radicals are each phenyl, $R_2$ is methyl, and $R_3$ is phenyl.

9. A polymer according to claim 7 where the R radicals are each methyl, $R_2$ is methyl, and $R_3$ is chlorophenyl.

10. A polymer according to claim 7 where the R radicals are each pentafluorophenyl, and $R_2$ and $R_3$ are each octyl.

11. A polymer according to claim 7 where the R radicals are each methyl phenyl, and $R_2$ and $R_3$ are each phenyl.

12. A polymer according to claim 7 where R, $R_2$ and $R_3$ are phenyl radicals.

No references cited.

SAMUEL H. BLECH, *Primary Examiner.*

260—502.4, 429.5, 33.6, 33.8, 30.4, 32.8;
106—177; 117—75, 132, 161